United States Patent
Matsuda et al.

(10) Patent No.: US 8,562,437 B2
(45) Date of Patent: Oct. 22, 2013

(54) KEYBOARD EQUIPPED WITH FUNCTIONS OF OPERATION BUTTONS AND AN ANALOG STICK PROVIDED IN A GAME CONTROLLER

(75) Inventors: Motohiro Matsuda, Kanagawa (JP); Shinichi Takeyama, Chiba (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/461,878

(22) Filed: May 2, 2012

(65) Prior Publication Data
US 2012/0289336 A1 Nov. 15, 2012

(30) Foreign Application Priority Data
May 9, 2011 (JP) ................. 2011-104780

(51) Int. Cl.
A63F 13/00 (2006.01)
A63F 13/02 (2006.01)
A63F 13/06 (2006.01)
G06F 3/02 (2006.01)

(52) U.S. Cl.
USPC ............... 463/37; 463/36; 463/38; 345/161

(58) Field of Classification Search
USPC ...................... 463/36–38; 345/161
See application file for complete search history.

(56) References Cited

U.S. PATENT DOCUMENTS

| | | | | |
|---|---|---|---|---|
| 3,772,597 A | * | 11/1973 | Stover .......................... | 375/242 |
| 4,469,330 A | * | 9/1984 | Asher ........................... | 463/38 |
| 4,680,577 A | * | 7/1987 | Straayer et al. ............... | 345/160 |
| 5,189,403 A | * | 2/1993 | Franz et al. ................... | 345/172 |
| D360,200 S | * | 7/1995 | Franz ........................... | D14/456 |
| D360,412 S | * | 7/1995 | Franz ........................... | D14/456 |
| D360,630 S | * | 7/1995 | Franz ........................... | D14/456 |
| 5,473,347 A | * | 12/1995 | Collas et al. .................. | 345/169 |
| 5,568,987 A | * | 10/1996 | Franz ........................... | 400/490 |
| 5,579,033 A | * | 11/1996 | Rutledge et al. ............... | 345/161 |
| 5,621,610 A | * | 4/1997 | Moore et al. .................. | 361/679.13 |
| 5,701,142 A | * | 12/1997 | Brown et al. .................. | 345/168 |
| 5,712,660 A | * | 1/1998 | Martin ......................... | 345/161 |
| 5,791,992 A | * | 8/1998 | Crump et al. .................. | 463/41 |
| 5,828,363 A | * | 10/1998 | Yaniger et al. ................ | 345/156 |
| 5,874,906 A | * | 2/1999 | Willner et al. ................. | 341/22 |
| 5,880,685 A | * | 3/1999 | Weeks ......................... | 341/22 |

(Continued)

FOREIGN PATENT DOCUMENTS

JP 3117837 U 12/2005

OTHER PUBLICATIONS

Office Action for corresponding Japanese Patent Application No. 2011-104780, dated Jul. 24, 2012.

(Continued)

Primary Examiner — William H McCulloch, Jr.
(74) Attorney, Agent, or Firm — Matthew B. Dernier, Esq.; Gibson & Dernier LLP

(57) ABSTRACT

A keyboard includes allotment keys to which the functions of operation buttons of a game controller are assigned, a pointing stick, and an Fn key. When the pointing stick is operated with the Fn key being operated, the keyboard outputs an operation signal of an analog stick of the game controller. When an allotment key is operated with the Fn key being operated, the keyboard outputs an operation signal of an operation button of the game controller.

6 Claims, 9 Drawing Sheets

(56) References Cited

U.S. PATENT DOCUMENTS

| | | | |
|---|---|---|---|
| 5,889,507 A * | 3/1999 | Engle et al. | 345/161 |
| 5,896,125 A * | 4/1999 | Niedzwiecki | 345/168 |
| 6,040,823 A * | 3/2000 | Seffernick et al. | 345/168 |
| 6,071,194 A * | 6/2000 | Sanderson et al. | 463/37 |
| 6,100,875 A * | 8/2000 | Goodman et al. | 345/163 |
| 6,107,996 A * | 8/2000 | Franz et al. | 345/172 |
| 6,121,954 A * | 9/2000 | Seffernick | 345/161 |
| 6,171,187 B1 * | 1/2001 | Audebert et al. | 463/37 |
| 6,445,382 B1 * | 9/2002 | Poole et al. | 345/168 |
| 6,488,584 B2 * | 12/2002 | Nelson | 463/37 |
| 6,597,345 B2 * | 7/2003 | Hirshberg | 345/168 |
| 6,621,485 B1 * | 9/2003 | Slotta | 345/168 |
| 6,724,369 B2 * | 4/2004 | Slotta | 345/161 |
| 6,909,424 B2 * | 6/2005 | Liebenow et al. | 345/169 |
| 7,088,339 B2 * | 8/2006 | Gresham | 345/168 |
| 7,336,206 B2 * | 2/2008 | Sugimura et al. | 341/22 |
| 7,589,712 B2 * | 9/2009 | Crowley et al. | 345/168 |
| 8,133,119 B2 * | 3/2012 | Finocchio | 463/37 |
| 8,221,229 B2 * | 7/2012 | Mikhailov et al. | 463/25 |
| 8,310,446 B1 * | 11/2012 | Owen et al. | 345/157 |
| 8,310,656 B2 * | 11/2012 | Zalewski | 356/29 |
| 8,313,380 B2 * | 11/2012 | Zalewski et al. | 463/39 |
| 8,411,029 B2 * | 4/2013 | Casparian et al. | 345/156 |
| 2001/0023204 A1 * | 9/2001 | Komata | 463/37 |
| 2002/0032055 A1 * | 3/2002 | Church et al. | 463/40 |
| 2002/0039922 A1 * | 4/2002 | Nelson | 463/37 |
| 2003/0218598 A1 * | 11/2003 | Shibata | 345/161 |
| 2005/0176504 A1 * | 8/2005 | Stanley | 463/37 |
| 2006/0082550 A1 * | 4/2006 | Chen | 345/161 |
| 2006/0202865 A1 * | 9/2006 | Nguyen | 341/22 |
| 2007/0281787 A1 | 12/2007 | Numata | |
| 2009/0054146 A1 * | 2/2009 | Epstein et al. | 463/38 |
| 2010/0255915 A1 * | 10/2010 | Spradley | 463/38 |
| 2011/0098116 A1 * | 4/2011 | Liu | 463/38 |
| 2011/0105231 A1 * | 5/2011 | Ambinder et al. | 463/38 |
| 2012/0289336 A1 * | 11/2012 | Matsuda et al. | 463/37 |
| 2012/0293935 A1 * | 11/2012 | Sherlock | 361/679.03 |

OTHER PUBLICATIONS

"Neko's Keyboard Room—ASCII Keyboard Controler -," [online] (mi-neko online, <URL:http://web.archive.org/web/20020716225851/http://mineko.fc2web.com/box/kb-room/items/gc-keyboardcontroler. html> Jul. 16, 2002 [searched on Jul. 12, 2012]) (see p. 1 paragraph 3 of the JP-OA for 2011-104780 for relevancy).

"Navigation Book for 'The Legend of Zelda: Ocarina of Time'," ed. Gozo Shiozaki, 1st ed., p. 19, (Axela, Jan. 14, 1999). (see p. 1 paragraph 3 of the JP-OA for 2011-104780 for relevancy).

* cited by examiner

FIG.6

| KEY NAMES | ASSGINED FUNCTIONS OF GAME CONTROLLER |
|---|---|
| F1 | △ BUTTON |
| F2 | □ BUTTON |
| F3 | SELECT BUTTON |
| F4 | START BUTTON |
| F5 | L3 BUTTON |
| F6 | L2 BUTTON |
| F7 | L1 BUTTON |
| F8 | R1 BUTTON |
| F9 | R2 BUTTON |
| F10 | R3 BUTTON |
| F11 | × BUTTON |
| F12 | ○ BUTTON |
| Insert | PAIRING BUTTON |
| CURSOR KEY | ARROW KEY |

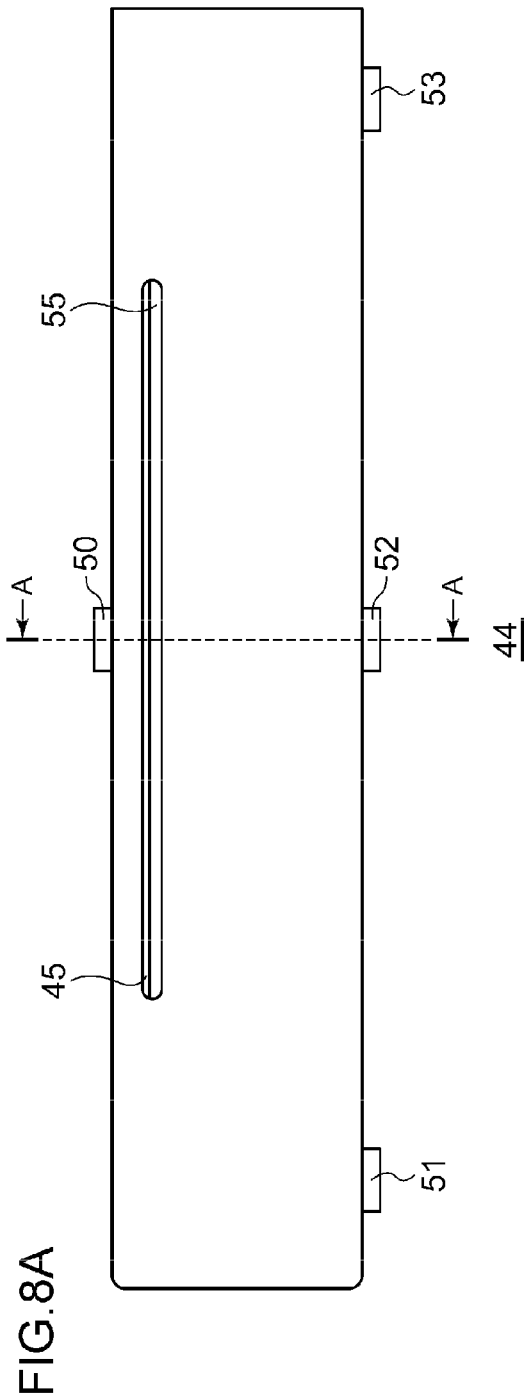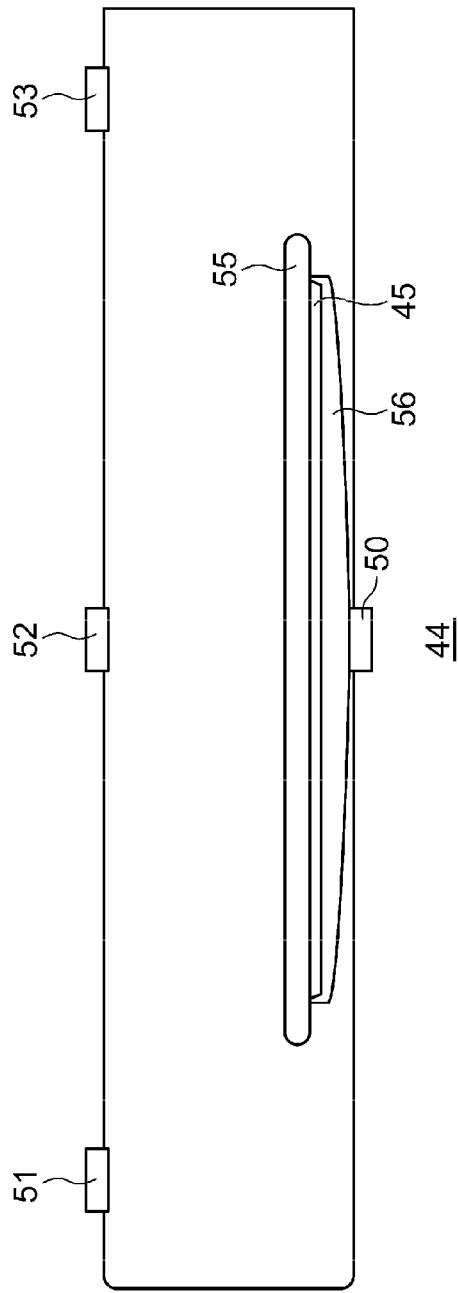

44

KEYBOARD EQUIPPED WITH FUNCTIONS OF OPERATION BUTTONS AND AN ANALOG STICK PROVIDED IN A GAME CONTROLLER

BACKGROUND OF THE INVENTION

1. Field of the Invention

The present invention relates to a keyboard equipped with a function of a game controller.

2. Description of the Related Art

In the typical conventional practice, a game device and a game controller are generally connected to each other by a cable. In recent years, however, a game system in which the game device and the controller are wirelessly connected to each other comes in to practical use. The use of the wireless game controller enables a user to operate game's characters or objects with relatively free posture.

RELATED ART LIST (1) United States Patent Application Publication No. US2007/0281787.

In recent years, a communication environment has been created in which the game devices of a plurality of users can be connected on-line via the Internet. This allows the users to communicate with each other using chat or electronic mail while playing games together. Since the users need to enter text messages for chat or electronic mails, it is difficult to do so in the conventional game controllers. Particularly with a game mainly featuring chat between the users, there are many instances when the user enters text messages and therefore a new type of input device is desired.

SUMMARY OF THE INVENTION

A purpose of the present invention is therefore to provide a new input interface enabling a user to enter texts with ease and operate a game, when necessary, by incorporating a function of a game controller into a keyboard.

In order to resolve the aforementioned problems, a keyboard according to one embodiment of the present invention is a keyboard equipped with functions of operation buttons and an analog stick provided in the game controller, and the keyboard includes: an operation member; and an output unit configured to output a signal according to an operation by the operation member. The operation member includes: a plurality of keys having allotment keys to which functions of the operation buttons of the game controller are assigned; a pointing stick placed in the keyboard; and a modifier key. When the pointing stick is operated with the modifier key being operated, the output unit outputs an operation signal of the analog stick of the game controller.

Optional combinations of the aforementioned constituting elements, and implementations of the invention in the form of methods, apparatuses, systems, recording media, computer programs, and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 6 shows an assignment table of key names and functions of a game controller;

FIG. 8A is a top view of a lid;

FIG. 8B is a bottom view of a lid; and

DETAILED DESCRIPTION OF THE INVENTION

The invention will now be described by reference to the preferred embodiments. This does not intend to limit the scope of the present invention, but to exemplify the invention.

A keyboard according to the present exemplary embodiment, which is provided with character keys arranged in a predetermined order, is used as a character inputting device and also used as an operational input device for a game device. More specifically, the keyboard according to the present exemplary embodiment has operation members where the functions of operation buttons and an analog stick of a game controller are assigned. In this keyboard, when a user operates the operation members with a predetermined modifier key (e.g., Fn key) being operated, the keyboard outputs an operation signal of the game controller. In the following description, a description will be given of the operation buttons and the analog sticks in the game controller before a description of the keyboard according to the present exemplary embodiment.

Figure 1:
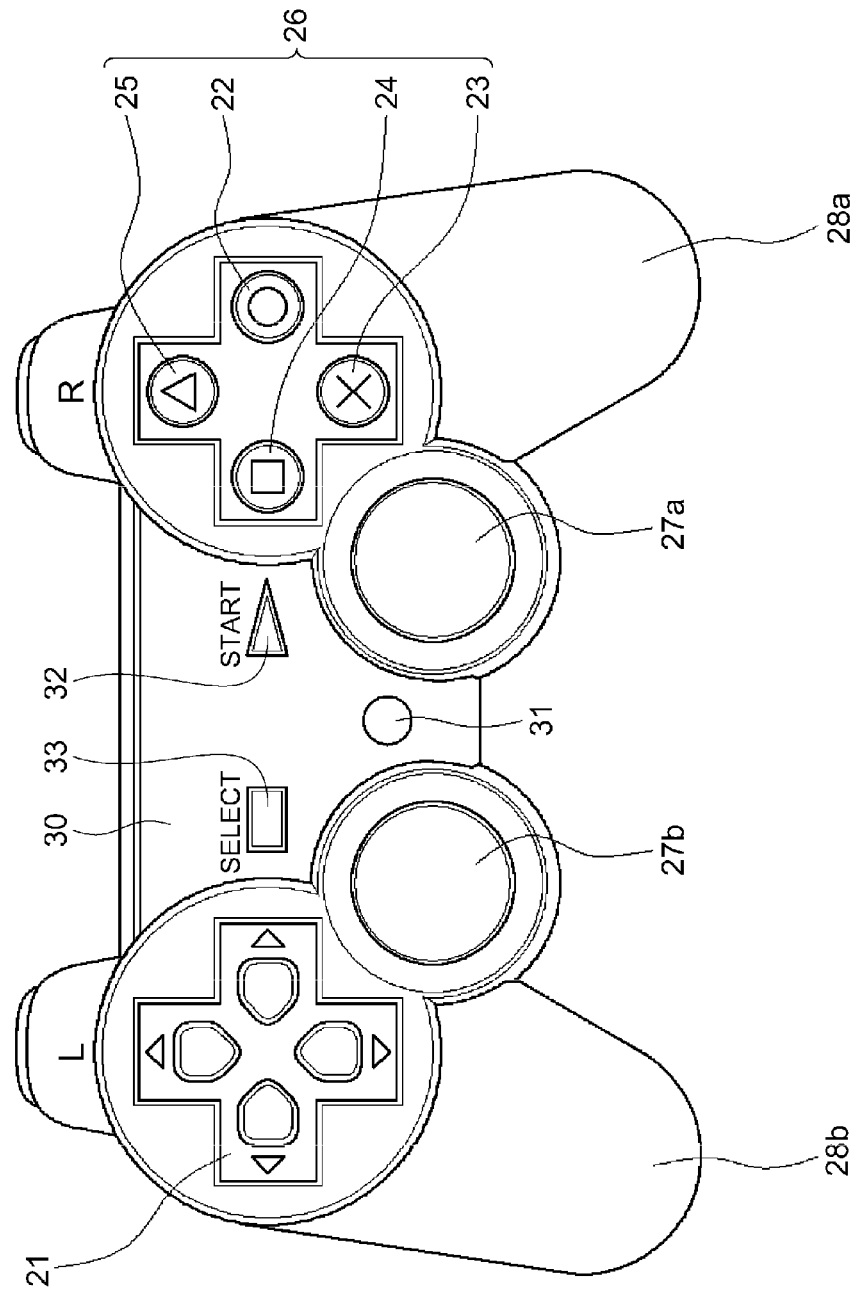
FIG. 1 shows an external structure of an upper side of a conventionally used game controller.

FIG. 1 shows an external structure of an upper side of a conventionally used game controller. Provided on a top surface 30 of a casing of a game controller 20 are an arrow key 21, a right-side analog stick 27a, a left-side analog stick 27b, and operation keys 26. These operation members are used by the user to operate characters or objects of a game.

The arrow key 21 is comprised of four operation buttons to indicate the up-down and left-right directions and four tilted directions, whereas the operation keys 26 are four kinds of operation buttons 22 to 25, respectively, to which the respective different functions are assigned depending on a game. The four kinds of buttons 22 to 25 are distinguished from one another by the marking of different symbols of different colors. For example, the "o" (circle) button 22 is marked with a red circle, the "x" (cross) button 23 with a blue cross, the "□" (square) button 24 with a purple square, and the "Δ" (triangle) button 25 with a green triangle. Of these four kinds of operation buttons 22 to 25, the circle button 22 and the cross button 23 are also called "decision buttons" and used when the user enters a decision instruction in many applications (games). In many cases, the decision keys are used when selecting the presented options. More specifically, the decision keys are used when the user selects Yes or No, and when the user select whether the user will proceed to the next step or not, for instance.

Also provided on the top surface 30 of the casing of the game controller 20 are a menu button 31, a START button 32, and a SELECT button 33 used when the user operates the game device. For example, the menu button 31 is a button with which to have a menu screen displayed on a display.

Figure 2:
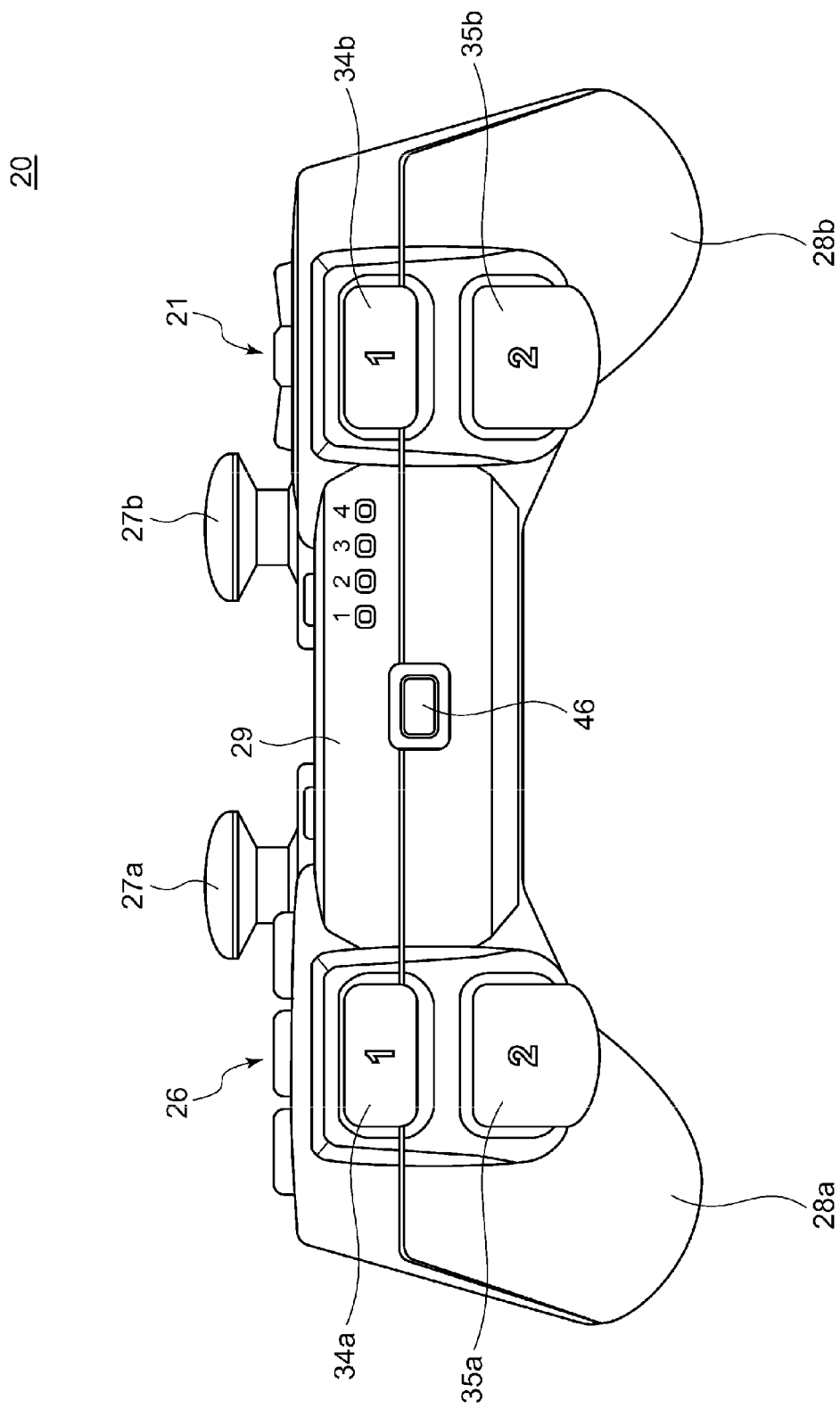
FIG. 2 is an external structure of a back side of a conventionally used game controller.

FIG. 2 is an external structure of a back side of the conventionally used game controller. LEDs used as indicators to indicate a controller number is provided in a casing back 29. Provided in the middle part of the casing back 29 is a USB connector 46.

On the casing back 29 side, an upper operation button (hereinafter referred to as "R1 button") 34a, an upper operation button (hereinafter referred to as "L1 button") 34b, a lower operation button (hereinafter referred to as "R2 button") 35a, and a lower operation button (hereinafter referred to as "L2 button") 35b are provided in their respective right-left (longitudinal) symmetrical positions of the casing back 29. The R1 button 34a and the L1 button 34b are positioned such that they can be operated with the tips of the forefingers or the middle fingers of the left and right hands respectively of the user holding a right-hand grip 28a and a left-hand grip 28b and operating operation buttons and analog sticks 27 on the top surface 30 with thumbs. And the R2 button 35a and the L2 button 35b are positioned such that they can be operated with the tips of the middle or fourth fingers of the user's left and right hands, respectively.

In the game controller 20, the analog sticks 27a and 27b are operation members used to perform an input operation according to a tilt amount and a tilted direction when the analog sticks 27a and 27b are tilted from the upright positions. Also, another different input operations can be performed if the analog sticks 27a and 27b are pressed down relative to the top surface 30 of the casing. That is, when the analog stick 27a is pressed in, the analog stick 27a operates as another operation button (hereinafter referred to as "R3 button"), whereas when the analog stick 27b is pressed down, the analog stick 27b operates as another operation button (hereinafter referred to as "L3 button").

As described above, the game controller 20 is provided with the arrow key 21 comprised of four operation buttons, the operation keys 26 which are four operation buttons, the menu button 31, the START button 32, the SELECT button 33, the right and left analog sticks 27a and 27B (and the R3 button and L3 button) which are all arranged on the top surface 30 of the casing. Also, the game controller is provided with the R1 button 34a, the L1 button 34b, the R2 button 35a, and the L2 button 35b which are all arranged on the casing back 29. The R1 button 34a, the R2 button 35a, and the R3 button are operated with the finger of the right hand of the user holding the right-hand grip 28a and the left-hand grip 28b. The L1 button 34b, the L2 button 35b, and the L3 button are operated with the finger of the left hand of the user holding the right-hand grip 28a and the left-hand grip 28b. The R1, R2 and R3 buttons and the L1, L2 and L3 buttons are provided in positions symmetrical to each other with respect to the central line of the game controller 20.

Figure 3:
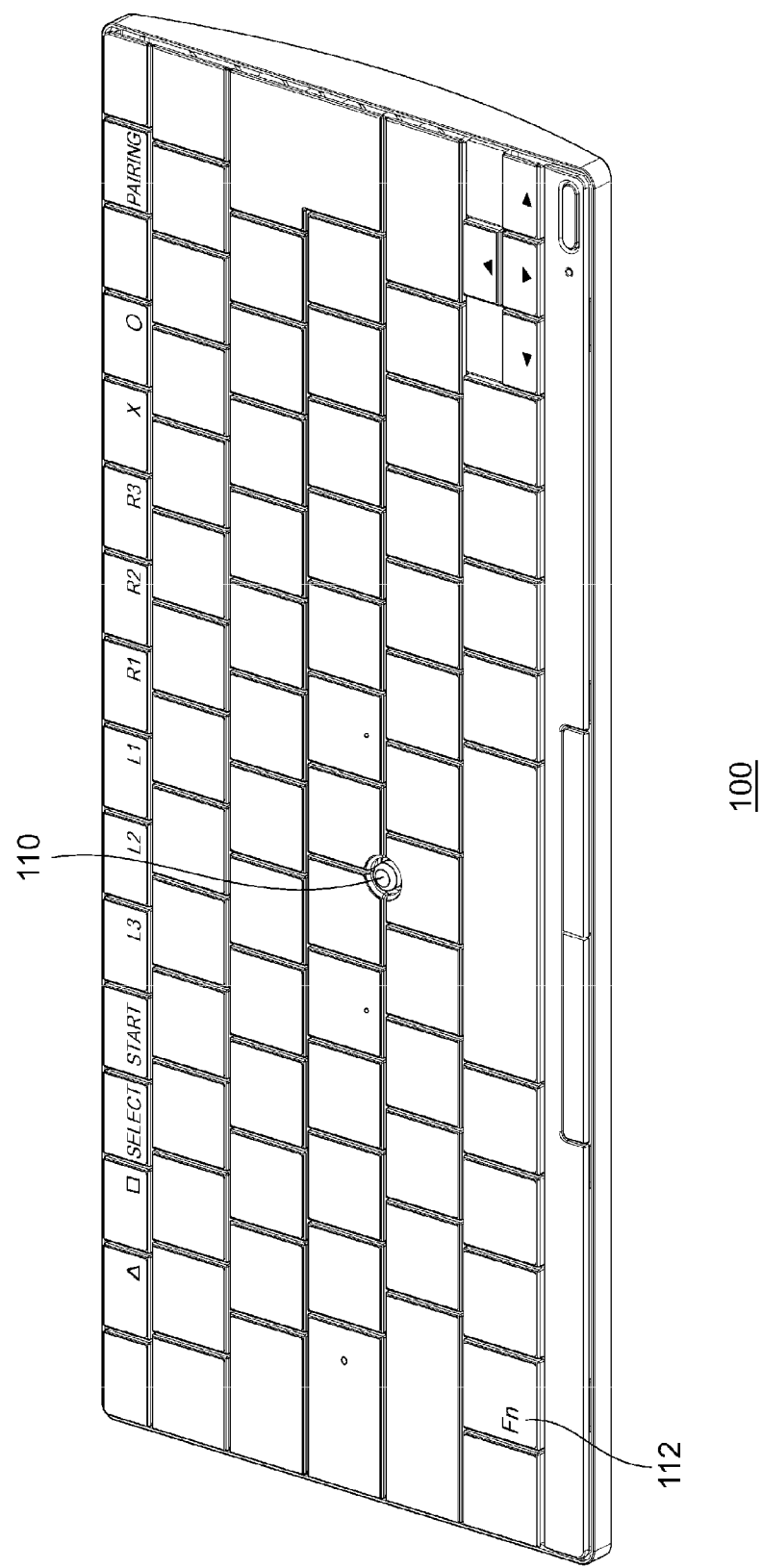
FIG. 3 is a top-side perspective view of a keyboard according to an exemplary embodiment of the present invention.

The keyboard according to the present embodiment is configured by including the functions of the operation buttons and the analog stick that the game controller 20 as shown in FIG. 1 and FIG. 2 has. FIG. 3 is a top-side perspective view of the keyboard according to an embodiment of the present invention. A keyboard 100 includes a plurality of operation members and an output unit for outputting signals according to the operations of the operation members. The operation members of the keyboard 100 includes at least a plurality of keys, such as character keys and function keys, modifier keys, such as those used to change the input characters and functions, and a pointing stick.

Figure 5:
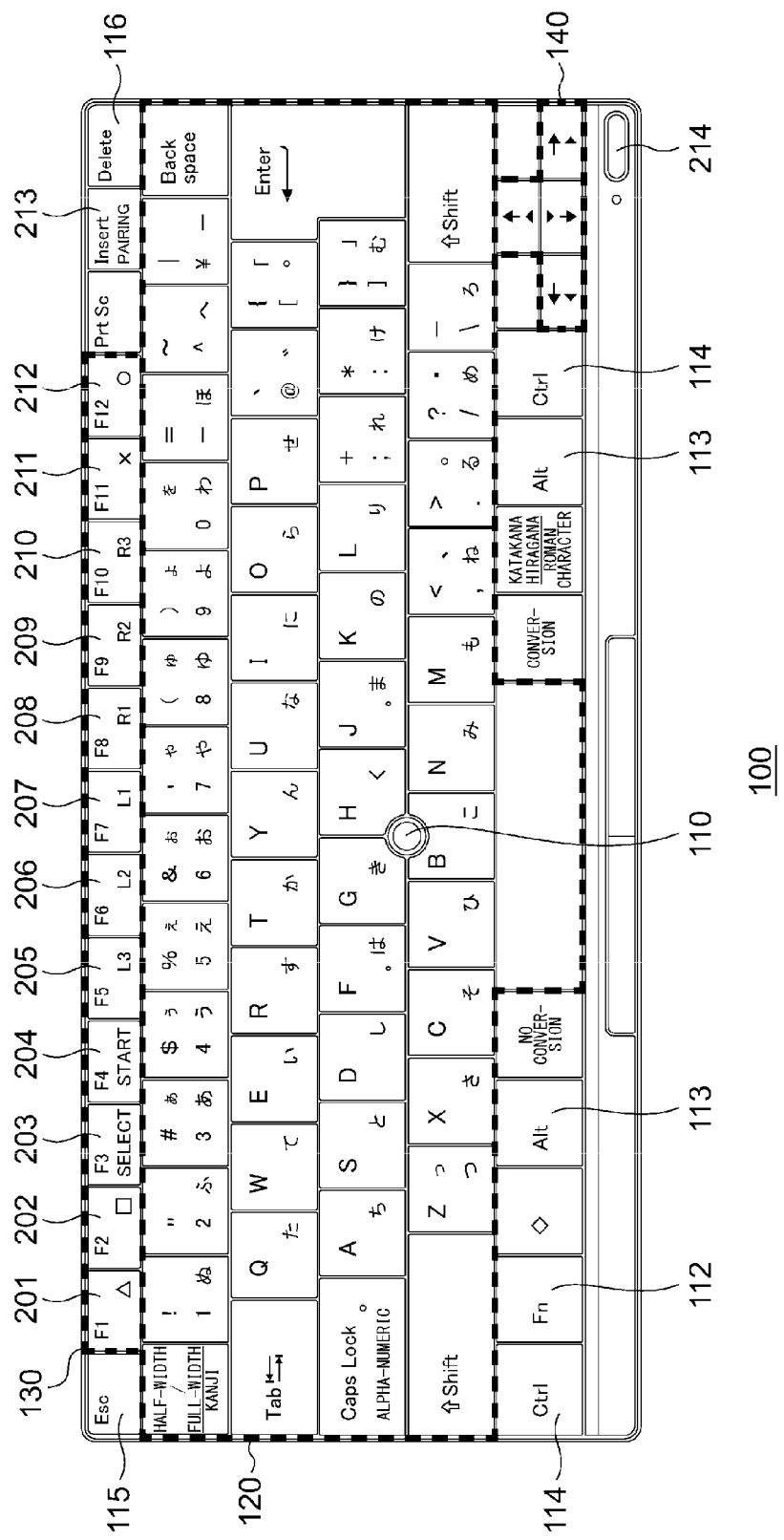
FIG. 5 illustrates a layout of a keyboard.

The keyboard 100 is configured by including a normal key arrangement (keyboard layout). The detail of the keyboard 100 is illustrated in FIG. 5. In FIG. 3, to explain the assignment of each operation button of the game controller 20, marks to identify the assigned operation buttons of the game controller 20 are shown on the keytop.

As shown in FIG. 3, the keyboard 100 is equipped with a plurality of keys including allotment keys (assignment keys) to which the functions of the operation buttons of the game controller 20 are assigned. Though the detail will be described in FIG. 5 and FIG. 6, the allotment keys shown in FIG. 3 are keys where the marks corresponding to the operation buttons of the game controller 20 are given. The marks may be engraved marks or printed marks.

The keyboard 100 is also equipped with a pointing stick 110. The pointing stick 110 is a pointing device that the user can move a pointer on a screen. The pointing stick 110 is arranged such that the pointing stick 110 can be tilted in a space between a plurality of keys in approximately center of the keyboard. The user conveys input instructions to the pointing stick 110 by using the finger tip so as to move a mouse pointer or the like on the screen. In the keyboard 100 according to the present exemplary embodiment, the function of the left-side analog stick 27b is assigned to the pointing stick 110.

The keyboard 100 has a key 112 which is called a modifier key used to change the input characters or functions of other keys. In the keyboard 100 according to the present exemplary embodiment, when the pointing stick 110 is operated with the key 112 being operated, the operation signals of the analog stick 27b of the game controller are outputted. Also, when the allotment keys are operated with the key 112 being operated, the operation signals of the operation buttons of the game controller are outputted. Note that when the key 112 is not operated, the keyboard 100 acts as an character inputting device which is the same as the normal keyboard. Note also that in the keyboard 100, the operation of the pointing stick 110 means that the force in a certain direction is applied to the pointing stick 110 and the operation of keys means that keys are pressed down.

Figure 4:
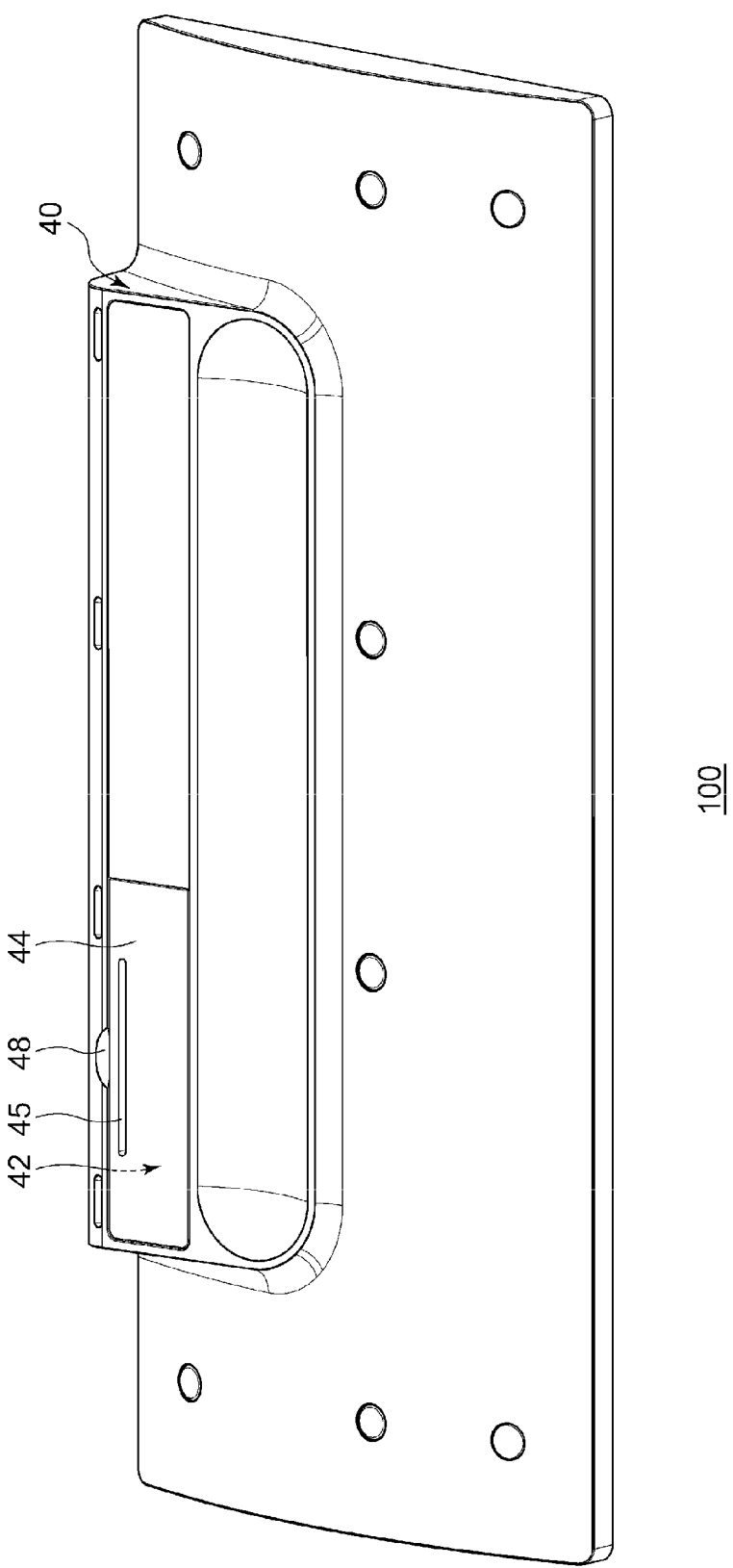
FIG. 4 is a bottom-side perspective view of a keyboard according to an exemplary embodiment of the present invention.

FIG. 4 is a bottom-side perspective view of the keyboard according to an exemplary embodiment of the present invention. A protuberant leg portion 40 is formed on the bottom side of the keyboard near the back edge so that when the keyboard 100 is placed on a desk, the back side of keyboard is higher than the front side and therefore a posture can be formed where the user can easily operate the keys. The leg portion 40 is provided with a battery box 42 that houses batteries, and the battery box is covered with a lid 44.

A slit 45 extending in a longitudinal direction is formed in the lid 44. And the lid 44 has elasticity in a lateral direction. When batteries are to be replaced, the user inserts his/her finger into an open/close claw 48 and presses the lid 44 in the lateral direction, the engagement of the lid 44 with the battery box 42 is released so that the lid 44 can be removed from the battery box 42.

FIG. 5 illustrates a layout of the keyboard. The keyboard 100 is configured by a layout of "109 Japanese keyboard" but may have other layouts. The keyboard 100 has standard type keys 120 including character keys and numeric keys, function keys 130 arranged on the top of the keyboard, cursor keys 140 for moving a cursor, and various other keys such as an Fn key 112, an Alt key 113, a Ctrl key 114, an Esc key 115, and a Delete key 116. In the keyboard 100, the Fn key 112, the Alt key 113, the Ctrl key 114, the Shift key and the like are called modifier keys (or special keys). When another key is pressed while a modifier key being pressed, the keyboard 100 outputs a code according to the combination of the modifier key and another key.

As explained in conjunction with FIG. 3, a mark to identify an allotted operation button is given on the keytop of a key (allotment key) to which a function of an operation button of the game controller 20 has been allotted.

FIG. 6 shows an assignment table of key names and functions of the game controller 20. Referring also to FIG. 1 and FIG. 2, among the function keys 130, the triangle button 25 is assigned to an F1 key 201, the square button 24 to an F2 key 202, the SELECT button 33 to an F3 key 203, the START button 32 to an F4 key 204, the L3 button to an F5 key 205, the L2 button 35*b* to an F6 key 206, the L1 button 34*b* to an F7 key 207, the R1 button 34*a* to an F8 key 208, the R2 button 35*a* to an F9 key 209, the R3 button to an F10 key 210, the cross button 23 to an F11 key 211, and the circle button 22 to an F12 key 212, respectively.

Also, the arrow key 21 is assigned to the cursor key 140, and a PAIRING button is assigned to an Insert key 213. The PARING button is used to have the game device recognize the keyboard 100. In the exemplary embodiment, the keys shown in the left column of FIG. 6 are called the "allotment keys" to which the operation buttons of the game controller 20 are assigned.

Figure 7:
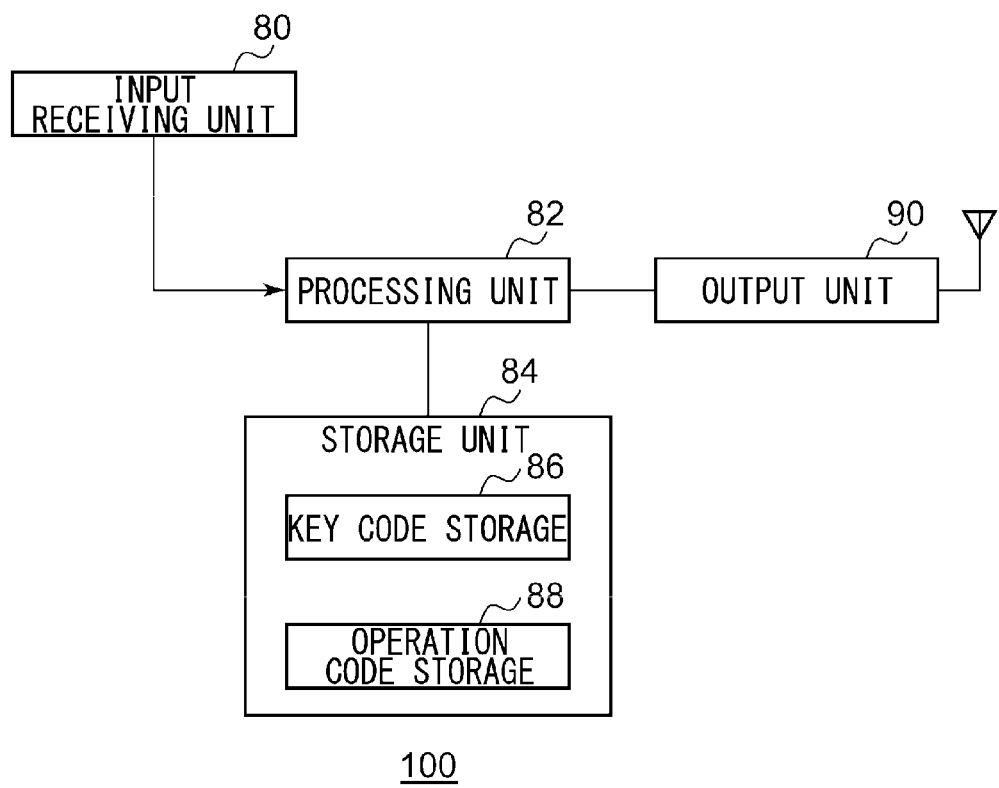
FIG. 7 illustrates functional blocks of a keyboard.

FIG. 7 illustrates functional blocks of the keyboard 100. The keyboard 100 includes an input receiving unit 80, a processing unit 82, a storage unit 84, and an output unit 90. The input receiving unit 80 receives an input operation of a key and/or the pointing stick 110 by the user. For example, a pair of fixed contact points is provided below each key, and the pair of fixed contact points electrically conducts when the key is pressed. The input receiving unit 80 identifies the depressed key by detecting the conduction of the pair of fixed contact points, and transmits the information with which to identify the depressed key (input key information) to the processing unit 82. When the pointing stick 110 is tilted, the input receiving unit 80 transmits the information with which to identify the tilted direction and the tilt amount (tilt information) to the processing unit 82. For convenience of explanation, the input key information and the tilt information will be hereinafter generically referred to as "input information".

The storage unit 84 has a key code storage 86 and an operation code storage 88. The key code storage 86 stores key codes assigned to the respective keys in the 109 Japanese keyboard. The key code storage 86 also stores key codes assigned to the combination (combination keys) of the modifier key (e.g., Shift key) and the character key.

The operation code storage 88 stores operation codes when the pointing stick 110 or an allotment key is operated while the Fn key 112 is being pressed. The operation codes are the same as those assigned to the analog sticks and the operation buttons of the game controller 20.

Upon receipt of the input information from the input receiving unit 80, the processing unit 82 reads out the corresponding code from the storage unit 84 and supplies the code to the output unit 90. At this time, if the input information is not the information with which to identify the Fn key 112, the processing unit 82 will read out the corresponding key code by referencing the key code storage 86 and then supply the key code to the output unit 90. Upon receipt of the tilt information on the pointing stick 110 from the input receiving unit 80, the processing unit 82 supplies a shift signal of the pointer displayed on the screen to the output unit 90. If, on the other hand, the input information is the information with which to identify the Fn key 112 and the input information is received from the input receiving unit 80 while the Fn key 112 is being pressed, the processing unit 82 will read out the corresponding operation code by referencing the operation code storage 88 and supply the operation code to the output unit 90.

The output unit 90 outputs to the game device a signal corresponding to an operation performed by an operation member of the keyboard 100, using for example the Bluetooth (registered trademark) protocol. More specifically, upon receipt of the key code from the processing unit 82, the output unit 90 transmits a key output signal to the game device. Upon receipt of the key output signal, the game device displays the corresponding text on the screen. As the output unit 90 receives a shift signal of the pointer from the processing unit 82, the output unit 90 transmits the shift signal thereof to the game device. As the game device receives the shift signal thereof, the game device moves the pointer on the screen according to the shift signal received.

As the output unit 90 receives an operation code of the game controller 20 from the processing unit 82, the output unit 90 transmits the operation signal of the game controller 20 to the game device. As the pointing stick 110 is operated with the Fn key 112 being operated while the user uses the keyboard 100, the output unit 90 outputs the operation signal of the analog stick 27*b* of the game controller 20. As an allotment key is operated with the Fn key 112 being operated, the output unit 90 outputs the operation signal of an operation button of the game controller 20. Upon receipt of the operation signal of the game controller 20, the game device reflects the thus received operation signal in the game progress.

The pointing stick 110 performs the same input operation, with a tilt amount and in a tilted direction, as that performed by the analog stick 27*b*. By assigning the function of the analog stick 27*b* of the game controller 20 to the pointing stick 110, the user can apply the tilt operation by the pointing stick 110 to the input of an analog amount to the game device with the same operation and touch feeling as that gained by the analog stick 27*b*.

Also, the distance between the Fn key 112 and the pointing stick 110 in order to operate the keyboard 100 as the game controller 20 is preferably set to such a value that the user can operate the Fn key 112 and the pointing stick 110 with one hand. More specifically, the distance between the Fn key 112 and the pointing stick is set to a value of 10 cm or less. Thereby, while the user presses the Fn key 112 and the pointing stick 110 simultaneously with one hand, user can operate an allotment key with the other hand. Thus, the output unit 90 can output the operation signals of the operation buttons which are functionally linked to the analog sticks 27 of the game controller 20.

In the keyboard 100, the Fn key 112 is provided near a corner of the keyboard 100 and more specifically the Fn key 112 is provided near the lower left corner thereof. Placing the Fn key 112 near the corner of the keyboard 100 facilitates the operation of the Fn key 112 by the user as compared with the case where the Fn key 112 is placed near the center. Thus, the frequency of erroneous operations can be reduced by this arrangement. Also, the arrangement of the Fn key 112 near the left corner of the keyboard 100 makes it easy for the user to operate the Fn key 112 and the pointing stick 110 with the left hand and simultaneously operate an allotment key in the function keys 130 with the right hand.

In the operation keys 26 of game controller 20, the circle button 22 and the cross button 23 are used as the decision keys to enter the user's instructions and are used more frequently than the square button 24 and the triangle button 25. Accordingly, the keys to which the circle button 22 and the cross button 23 are assigned are preferably designed as follows. That is, they are designed such that when the keyboard 100 is divided by a vertical central line, they are arranged on a side opposite to the side where the Fn key 112 is placed and therefore the hand operating circle button 22 or the cross button 23 is different from the hand operating the Fn key 112. For example, the cross button 23 and the circle button 22 are assigned to the F11 key 211 and the F12 key 212, respectively, and therefore the user can operate the F11 key 211 or the F12 key 212 with the right hand while he/she is operating the Fn key 112 with the left hand.

In the keyboard 100, it is desirable that the function of an operation button placed at the right side or the left side of the game controller 20 is assigned to a key positioned at the right side or the left side of the pointing stick 110. In the game controller 20, the R1 button 34a, the R2 button 35a, and the R3 button are the operation buttons position at the right side. Referring now to FIG. 5, among the function keys 130, the function of the R1 button 34a is assigned to the F8 key, the function of the R2 button 35a to the F9 key 209, and the function of the R3 button to the F10 key 210, which are all positioned at the right side of the pointing stick 110. Note also that the aforementioned circle button 22 and the cross button 23 are placed at the right side of the game controller 20. Thus the functions of the cross button 23 and the circle button 22 are assigned respectively to the F11 key 211 and the F12 key 212 positioned at the right side of the pointing stick 110. With this arrangement, in the keyboard 100, the user can operate the R1 button 34a, the R2 button 35a, the R3 button, the cross button 23, and the circle button 22 with the right hand similarly to the game controller 20.

This will be explained, as follows, with reference to the position of the Fn key 112. That is, where in the keyboard 100 the Fn key 112 is positioned at the left side or at the right side of the pointing stick 110, the function of an operation button is assigned to a key positioned at the opposite side of the Fn key 112 in the keyboard 100, where the operation button is arranged in the game controller 20 at the same side as the assigned key. Shown in this example is a case where the Fn key 112 is positioned at the left side of the pointing stick 110, and the function of an operation button arranged at the opposite side (i.e., the right side) in the game controller 20 is assigned to a key (F8 key 208 to F12 key 212) positioned at the opposite side of the Fn key 112 (i.e., the right side of the pointing stick 110). As a result, while the Fn key 112 and the pointing stick 110 are simultaneously operated with the left hand, it is easy for the user to operate with the right hand a key to which the function of an operation button positioned at the right side of the game controller 20 is assigned. Thus, the operation and touch feeling in the game controller 20 can be obtained in the keyboard 100.

In the game controller 20, the R1 button 34a, the R2 button 35a, the R3 button, the L1 button 34b, the L2 button 35b, and the L3 button are provided in symmetrical positions such that the R1 button 34a, the R2 button 35a and the R3 button are positioned symmetrically to the L1 button 34b, the L2 button 35b and the L3 button, respectively, with respect to the central line of the game controller 20.

These positional relations are adopted in the keyboard 100 as well. That is, with a boundary between the F7 key 207 and the F8 key 208 as a reference line, the L1 button 34b, the L2 button 35b and L3 button are assigned in this order on the left of the reference line, whereas the R1 button 34a, the R2 button 35a and the R3 button are assigned in this order on the right of the reference line.

For example, it is also possible to assign the R1 button 34a, the L1 button 34b, the R2 button 35a, the L2 button 35b, the R3 button, and L3 button to the F5 key 205 to the F10 key 210 (staring from the left), respectively. In this case, however, the symmetrical relation between the R buttons and the L buttons cannot be maintained and therefore it is not so easy for the user to intuitively figure out the assignment arrangement.

As described above, in the game controller 20, the L1 button 34b and the L2 button 35b are operated by the combination of the forefinger and the middle finger of the left hand (or the combination of the middle finger and the fourth finger). Also, the R1 button 34a and the R2 button 35a are operated by the combination of the forefinger and the middle finger of the right hand (or the combination of the middle finger and the fourth finger). In other words, the L1 button 34b and the L2 button 35b are operated by two adjacent fingers of the left hand, whereas the R1 button 34a and the R2 button 35a are operated by two adjacent fingers of the right hand. Thus, if the L1 button 34b and the L2 button 35b are assigned to the F7 key 207 and F6 key 206 on the left of the reference line in this order, the user can operate the F7 key 207 and the F6 key 206 with the two adjacent fingers of the left hand, respectively, while the user operates the Fn key 112 with the right hand. Also, if the R1 button 34a and the R2 button 35a are assigned to the F8 key 208 and F9 key 209 on the right of the reference line in this order, the user can operate the F8 key 208 and the F9 key 209 with the two adjacent fingers of the right hand, respectively, while the user operates the Fn key 112 with the left hand.

In this manner, the boundary between the F7 key 207 and the F8 key 208 is used as the reference line. Then, the L1 button 34b, the L2 button 35b, and the L3 button are assigned on the left of the reference line, whereas the R1 button 34a, the R2 button 35a, and the R3 button are assigned on the right of the reference line. Thus, the user can operate them intuitively, thereby realizing the key arrangement having excellent operability. Note that the central line of the keyboard 100 is substantially the line passing through the pointing stick 110. The operability of the R buttons and the L buttons can be improved by bringing this central line and the boundary line between the F7 key 207 and the F8 key 208 closer to each other (i.e., by a distance shorter than width of key in the exemplary embodiment).

The present invention has been described based upon illustrative exemplary embodiments. These exemplary embodiments are intended to be illustrative only and it will be obvious to those skilled in the art that various modifications to the combination of constituting elements and processes could be developed and that such modifications are also within the scope of the present invention. In the exemplary embodiment, the single pointing stick 110 is provided but two pointing sticks 110 may be provided instead and the functions of the analog sticks 27a and 27b of the game controller 20 may be assigned to these two pointing sticks 110, respectively. In this case, the pointing sticks 110 may be provided in positions away from the pointing stick 110 shown in FIG. 5 by a predetermined distance to the right and left thereof. For example, one pointing stick may be provided in a space surrounded by the alphabets D, F, and C and the other pointing stick may be provided in a space surrounded by the alphabets J, K, and M.

The lid 44 of the battery box 42 in which the slit 45 is formed is shown in FIG. 4. Suppose that the width of the slit 45 is made larger. Then, the lid 44 will be more flexible in the lateral direction. In this case, however, the batteries contained in the battery box 42 is visible through the slit 45. This may present a disadvantage of the keyboard 100 from an esthetic point of view which is preferably corrected some way or other to make the batteries inside the battery box 42 much less conspicuous as seen through the slit 45.

FIG. 8A is a top view of the lid 44. The lid 44 has three claws 51, 52, and 53 on one side thereof and has a claw 50 on the opposite side thereof. The slit 45 extending in the longitudinal direction is formed in the lid 44 so that the lid 44 is elastic near the claw 50. When the lid 44 is to be fit in, the claws 51, 52, and 53 are first inserted into their respective claw engaging holes. As the lid 44 is then pressed in against the back side of the keyboard 100, the slit 45 is deformed in a collapsing direction, then the claw 50 is inserted into a claw engaging hole of the battery box 42 and the lid 44 is fit in the battery box 42. Also, when the lid 44 is to be removed, the user inserts his/her finger into the open/close claw 48 and presses the lid 44 in the lateral direction. Then the slit 45 is deformed in a collapsing direction due to the elasticity of the slit 45, then the engagement of the claw 50 with the claw of the battery box 42 is released and thereby the lid 44 is removed from the battery box 42.

In FIG. 8A, an overhang 55 provided on the bottom side of the lid 44 is seen from the slit 45. The overhang 55 plays a role of so-called blindfold which blocks the view of a part of the batteries housed in the battery box 42 from the slit 45.

FIG. 8B is a bottom view of the lid 44. The overhang 55 is provided in an upright portion formed on the back side of the lid 44, and the overhang 55 so projects as to cover at least a part of the slit 45. Note that the overhang 55 may be formed such that the overhang 55 covers the entire slit 45. A thin wall part 56 in which the thickness of the lid 44 is made smaller is formed in a direction where the overhang 55 projects. In this configuration, the overhang 55 does not come in contact with the wall of the slit 45 when a force in the lateral direction is applied to the lid 44 and thereby the width of the slit 45 become narrow.

Figure 9:
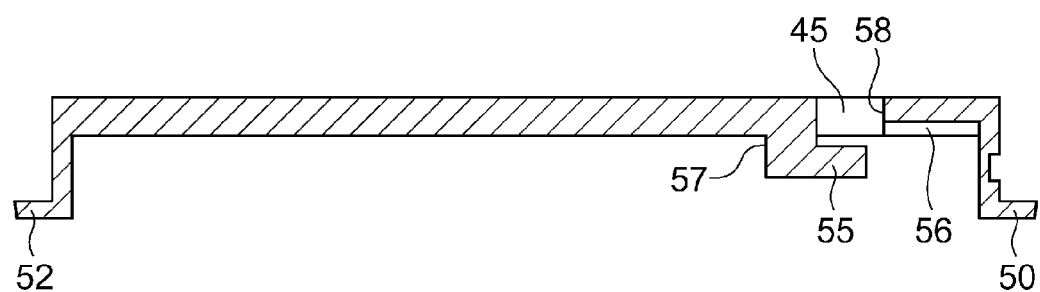
FIG. 9 is a cross-sectional view taken along the line A-A of FIG. 8A.

FIG. 9 is a cross-sectional view taken along the line A-A of FIG. 8A. As shown in FIG. 9, the overhang 55 is provided in an upright portion 57 on the back side of the lid 44, and the overhang 55 so projects under the slit 45 as to cover at least a part of the slit 45. This configuration makes the batteries, housed on the back side of the lid 44, less visible from outside, thereby enhancing a pleasant appearance of the keyboard 100 and the beauty in its entirety. Also, as described above, the thin wall part 56 positioned in the direction where the overhang 55 projects is formed such that the thickness of the lid 44 in a region adjacent to a slit wall part 58 is made smaller. Hence, the configuration is such that the slit wall part 58 of the slit 45 and the tip of the overhang 55 do not hit each other when the lid 44 contracts in the lateral direction.

What is claimed is:

1. A keyboard equipped with functions of operation buttons and an analog stick provided in a game controller, the keyboard comprising:
    an operation member; and
    an output unit configured to output a signal according to an operation by the operation member,
    the operation member including:
    a plurality of keys having allotment keys to which respective functions of the operation buttons of the game controller are assigned;
    a pointing stick placed in the keyboard; and
    a modifier key,
    wherein, when the pointing stick is operated, independently of the allotment keys, with the modifier key being operated, the output unit outputs an operation signal of the analog stick of the game controller independently of any operation signals of the allotment keys, and when the pointing stick is operated with the modifier key not being operated, the output unit outputs a shift signal of a pointer displayed on a screen,
    wherein, when one or more of the allotment keys is operated, independently of the pointing stick, with the modifier key being operated, the output unit outputs one or more operation signals of the respective one or more operation buttons of the game controller independently of the operation signal of the pointing stick, and when the one or more allotment keys are operated with the modifier key not being operated, the output unit does not output one or more operation signals of the respective one or more operation buttons of the game controller, and
    wherein, when the pointing stick and one or more of the allotment keys are operated simultaneously, along with the modifier key being operated, the output unit simultaneously outputs the one or more operation signals of the respective one or more operation buttons of the game controller and the operation signal of the analog stick of the game controller.

2. A keyboard according to claim 1, wherein the pointing stick is arranged at approximately a center of the keyboard.

3. A keyboard according to claim 1, wherein the modifier key is provided near a corner of the keyboard.

4. A keyboard according to claim 1, wherein a distance between the modifier key and the pointing stick is set to a value equal to or less than 10 cm so that a user may operate the modifier key and the pointing stick with one hand.

5. A keyboard according to claim 1, wherein the function of an operation button placed at a right side or a left side of the game controller is assigned to a key placed at a right side or a left side of the pointing stick.

6. A keyboard according to claim 1, wherein the modifier key is placed at one of a left and a right side of the pointing stick, the function of the operation button of the game controller is assigned to the key positioned at the other of the left and right side of the pointing stick as the modifier key, and the operation button is arranged in the game controller at an opposite side to the modifier key.

* * * * *